United States Patent Office 3,489,723
Patented Jan. 13, 1970

3,489,723
TWO-COMPONENT CASTABLE POLYURETHANE ELASTOMER COMPOSITION AND USE
Elise Rhoda Kraft, New York, N.Y., assignor to Nopco Chemical Company, Newark, N.J., a corporation of New Jersey
No Drawing. Filed Dec. 6, 1966, Ser. No. 599,411
Int. Cl. C08g 41/00
U.S. Cl. 260—77.5          5 Claims

ABSTRACT OF THE DISCLOSURE

An improved two-component castable polyurethane elastomer composition consists of (1) a resin component containing a polyether polyol, a chemically hindered amine as a curing agent and a solubilizer, and (2) a quasi urethane prepolymer component containing a quasi urethane prepolymer. The resin component and quasi prepolymer component are mixed at room temperature to obtain a uniform composition that is used as an encapsulating, casting or molding composition which is subsequently cured.

---

The present invention relates to castable polyurethane elastomer compositions and more particularly to improved two-component systems wherein one component is a resin component containing a polyether polyol, a chemically hindered amine as a curing agent and a solubilizer and the other component is a quasi urethane prepolymer component containing a quasi urethane prepolymer.

Previously, polyurethane cast elastomers have been prepared by one-step and two-step processes. The one-step process involves interreacting specific quantities of (1) a polyoxyalkylene polyol or mixtures thereof, (2) a chemically hindered aromatic diamine, and (3) an organic diisocyanate in the presence of (4) a polyvalent organo-metallic salt catalyst at from 0° C. to 120° C. and curing the reaction mixture at 20° C. to 150° C. Although the one-step process has advantages such as savings in equipment, processing time and the like, the one-step process has numerous disadvantages. It requires specialized equipment, precise control, special catalysts, specific reaction conditions and the like. Further, the one-step process lacks flexibility and is not suitable for producing a variety of molded products for intermittent production or small scale production of molded products. The two-step process involves as the first step the preparation of a quasi- urethane prepolymer and as the second step the interreaction of the prepolymer with a chemically hindered diamine under specific conditions of temperature and pressure to obtain a reaction mixture. The resulting reaction mixture is then poured into a mold and cured preferably at a temperature of about 100° C. to produce the molded article. Although the two-step process is more suitable for most applications than the one-step process, it has numerous disadvantages. Suitable chemically hindered diamines, which are employed, are solids which are not readily soluble in the prepolymer at room temperature. Consequently, the diamine must be either (1) dissolved in the prepolymer by heating the diamine in the prepolymer or (2) dissolved in a high molecular weight of polyol which is then added to the prepolymer. Neither procedure is satisfactory. If procedure (1) is used at the temperature required to melt the diamine, the elastomer produced will not have a satisfactory pot life. If procedure (2) is used, the resulting physical properties are not acceptable.

An object of this invention is to provide an improved two component castable polyurethane elastomer composition. A further object is to provide an improved two-step process for producing cured polyurethane elastomers. Another object is to provide improved cured polyurethane elastomers. Other objects of this invention will become apparent from the detailed description given hereinafter. It is intended that the detailed description and specific examples do not limit the present invention but merely indicate preferred embodiments thereof, since various changes and modifications within the scope of this invention will become apparent to those skilled in the art.

The above objects as well as other objects of the present invention have been most unexpectedly and successfully achieved in the following manner. I have discovered a new and novel class of improved two component castable polyurethane compositions which are useful in producing improved cured polyurethane elastomers. I have also discovered that use of the new and novel compositions provides an improved two-step process for producing cured polyurethane elastomers. Further, I have found that this new and novel class of compositions and processes are particularly useful in the encapsulation of electronic parts and the like and in the manufacture of mechanical parts, shock absorbers and the like.

The polyurethane compositions of this invention are two component systems, i.e. (1) a resin component which contains a polyoxyalkylene polyol, a chemically hindered aromatic diamine and a solubilizer and (2) a quasi urethane prepolymer component. The resin component contains a total of about 0.9 OH and $NH_2$ equivalents, i.e. about 0.3 OH equivalent of a polyoxyalkylene polyol having an average molecular weight of from about 260 to about 1300 plus about 0.6 $NH_2$ equivalent of a chemically hindered aromatic diamine. Also present is about equal parts by weight of a solubilizer based on the weight of the polyol. The quasi prepolymer component contains from about 0.8 NCO equivalent to about 1.2 NCO equivalents and is the reaction product of (1) an organic diisocyanate having an NCO equivalent of about 1.0, and (2) a polyoxylalkylene polyol having an average molecular weight of from about 710 to about 1290, having at least two terminal hydroxyl groups and having an OH equivalent of from about 0.2 to about 0.7. Thus, the quasi prepolymer is an isocyanate terminated adduct of an organic diisocyanate and a polyoxyalkylene polyol. The sole reactive group in these isocyanate terminated quasi prepolymers are reactive isocyanate groups. Such isocyanate terminated quasi urethane prepolymers are well known in the art and are frequently used instead of organic diisocyanates because the quasi prepolymers are less toxic, have lower volatilities and are more convenient to use than organic diisocyanates per se. If desired, mixtures of the polyoxyalkylene polyols, solubilizers and organic diisocyanates can be used instead of individual polyols, solubilizers and organic diisocyanates in the formulations for the resin and quasi prepolymer components described above, provided the individual polyols, solubilizers and organic diisocyanates used in the components are within the limits for such materials as given herein.

PREPARATION OF THE RESIN COMPONENT

The resin component is prepared in the following manner. The raw materials used in the resin component should not contain more than 0.01% by weight of water. If the raw materials are not used immediately, they should be stored in sealed containers, preferably at temperatures of from about 40° F. to about 77° F. to avoid contamination by moisture. Likewise, the resulting resin component should not contain more than 0.01% by weight of water and should also be stored in sealed containers, preferably at temperatures of from about 40°

F. to about 77° F. to avoid contamination by moisture. If desired, the individual ingredients used in the resin component can be dried separately by appropriate means or they can be combined and the resulting resin component dried. A convenient method for drying the polyoxyalkylene polyols, solubilizers and/or their mixtures containing the chemically hindered aromatic diamine is vacuum stripping. This method involves heating the particular ingredient or mixture at about 250° F. for about two hours under a vacuum of about 3 mm. of Hg to strip the water from the material. The resulting dry material is then cooled under vacuum and is stored in a sealed container to avoid moisture contamination.

The resin component can be prepared by mixing the above mentioned proportions of dried polyoxyalkylene polyols, dried chemically hindered aromatic diamine and dried solubilizer under anhydrous conditions, heating the resulting mixture with agitation under anhydrous conditions to a temperature of from about 200° F. to about 250° F. for about 2 hours to about 24 hours to dissolve the diamide, cooling the resulting resin component under anhydrous conditions to room temperature and storing the resin component in a sealed container preferably at about 40° F. to about 77° F. to minimize moisture contamination. Likewise, the resin component can be prepared by mixing the required amounts of polyoxyalkylene polyol, chemically hindered aromatic diamine and solubilizer, heating the resulting mixture to about 200° F. under a vacuum of about 3 mm. Hg, to dissolve the diamide, then heating the mixture at about 200° F. under a vacuum of about 3 mm. Hg to strip water from the mixture and to obtain the desired dried resin component, cooling the resulting dried resin component under anhydrous conditions to room temperature and storing the resin component in a sealed container preferably at about 40° F. to about 77° F. to minimize moisture contamination.

As examples of polyoxyalkylene polyols which may be employed in the resin component, the following polyoxyalkylene polyols can be employed. A polyoxyalkylene polyol having an average molecular weight of from about 260 to about 1300 and having from about two to about eight terminal hydroxyl groups or mixtures of two or more such polyols may be used. Specific polyols include polyoxypropylene glycols having an average molecular weight of 400 and having two terminal hydroxyl groups, polyoxypropylene glycols having an average molecular weight of 700 and containing two terminal hydroxyl groups, polyoxyalkylene triols having an average molecular weight of about 340 and having three terminal hydroxyl groups, polyoxy triols having an average molecular weight of about 260 and having three terminal hydroxyl groups, polyoxyalkylene triols having an average molecular weight of 700 and having three terminal hydroxyl groups and the like. Polyoxyalkylene polyols having four or more terminal hydroxyl groups can also be employed. Likewise, glycols such as a polyoxybutylene glycol having an average molecular weight of 750, polyoxyhexamethylene glycol having an average molecular weight of 950, polyoxyoctamethylene glycol having an average molecular weight of 1150, polyoxynonamethylene glycol having an average molecular weight of 1160, polyoxydecamethylene glycol having an average molecular weight of 1170, polyoxydodecamethylene glycol having an average molecular weight of 1190 and mixtures thereof can be used. Polyoxyalkylene glycols containing several different radicals in the molecular chain such as, for example, compounds of the formula:

$HO(CH_2OC_3H_6O)_nH$ wherein $n$ is an integer of from about 4 to about 19 can also be used. For example, polyacetals having two terminal groups and average molecular weights of from about 260 to about 1300 can be used. Such polyacetals are prepared by reaction of an aldehyde and an alcohol such as formaldehyde and propylene glycol. Other polyoxyalkylene polyols, which can be employed in the preparation of the resin component, include those prepared by the reaction of 1,2-alkylene oxides such as propylene oxide, butylene oxide, styrene oxide, dicyclopentadiene oxide, their mixtures and the like with polyhydroxy compounds such as glycerol, hydroxyl containing glycerides, trimethylolethane, trimethylolpropane, 1,2,6-hexanetriol, pentaerythritol, dipentaerythritol, tripentaerythritol, sorbitol, mannitol and the like, glucosides such as methyl, ethyl, propyl, butyl and 2-ethylhexyl arabinoside, xyloside, fructoside, glucoside, rhammoside and sucrose. For example, a propylene oxide adduct of glycerol having an average molecular weight of 750 can be used. A propylene oxide adduct of trimethylol propane terminated with ethylene oxide to obtain a product having three primary hydroxyl groups and having an average molecular weight of 940 can also be used. Likewise, a propylene oxide adduct of pentaerythritol having an average molecular weight of 620 and four terminal hydroxyl groups can be used. A propylene oxide adduct of 1,2,6-hexanetriol having an average molecular weight of 740 can be employed. Polyoxyalkylene polyols obtained by reacting the above-mentioned alkylene oxides with mononuclear polyhydroxybenzenes such as resorcinol, pyrogallol, phloroglucinol, hydroquinone, 4,6-di-ti-butylcatechol, catechol, orcinol and other alkylated polyhydroxybenzenes are also useful. Likewise, polyoxyalkylene polyols prepared by reacting the abovementioned alkylene oxides with fused ring systems such as 3-hydroxy-2-naphthol, 6,7-dihydroxy-1-naphthol, 2,5-dihydroxy-1-naphthol, 9,10-dihydroxy anthracene, 2,3-dihydroxy phenanthrene and the like can be used.

Other useful polyoxyalkylene polyols having the above-mentioned molecular weights can be prepared by reacting the abovementioned alkylene oxides or mixtures thereof with polynuclear phenols such as the various di-, tri- and tetra-phenol derivatives in which the phenols are attached to each other by means of single bonds or by an aliphatic hydrocarbon radical such as a methylene radical.

Another useful group of polyoxyalkylene polyols which can be employed are the alkylene adducts of the Novolaks having the abovementioned molecular weights. The Novolaks are believed to be mixtures of polynuclear compounds having a diphenylmethane type of structure such as 4,4'-dihydroxy diphenylmethane and 2,4'-dihydroxy diphenylmethane formed by the Baeyer reaction of phenol and formaldehyde. In a typical synthesis, Novolaks are prepared by condensing one mole of a phenol such as phenol, cresol or other alkylated phenol with 0.8 mole of an aldehyde such as formaldehyde or furfuraldehyde under acidic conditions at temperatures of from about 160° C. to about 170° C. Such polynuclear phenols frequently contain from 4 to 8 units and may contain 6 or more units. It is to be understood that Novolaks employed in the preparation of polyols for the present invention will not contain a sufficient number of units that when they are reacted with alkylene oxides to obtain the desired polyols, the molecular weights of the resulting polyols will not exceed the abovementioned average molecular weights. The Novolaks are non-curable thermoplastic resins.

Other suitable polyalkylene polyols include the 1,2-alkylene oxide derivatives of mononuclear primary amines such as o-, m-, and p-phenylenediamine; 2,4- and 2,6-diaminotoluene; 2,6 - diamine - p - xylene; 4,6 - diamino-m-xylene; 2,4-diamino-m-xylene; 3,5-diamino-o-xylene; isohexyl-p-phenylenediamine; 3,5-diaminotoluene, and the like; polynuclear and fused aromatic polyamines such as 1,4 - naphthylenediamine; 1,5 - naphthylenediamine; 1,8-naphthylenediamine; benzidine; toluidine; 4,4'-methylenedianiline; 3,3' - dimethoxy - 4,4' - biphenyldiamine; 3,3'-dichloro-4,4'-biphenyldiamine; 3,3'-dimethyl-4,4'-biphenyldiamine; 4,4'-ethylenedianiline; 4,4'-ethylidenedianiline; 1-fluoreneamine; 2,5-fluorenediamine; 2,7-fluorenediamine; 1,4-anthradiamine; 3,3'-biphenyldiamine; 3,4-biphenyldiamine; 9,10-diaminophenanthrene; 4,4'-diaminobenzene and the like.

Higher functional mono- and polynuclear polyamines can also be reacted with 1,2-alkylene oxides to provide useful polyoxyalkylene polyols. These amines include 2,4,6-triaminotoluene, 2,3,5-triaminotoluene; 5,6-diaminoacenaphthalene, 4,4',4''-methylidynetrianiline, 3,5-diaminobenzoic acid, triaminodiphenyl ethers and sulfides such as 2,4,4'-triaminodiphenyl ether, 2,3',4-triamino-4'-methoxydiphenyl ether, the corresponding sulfides and the like; polyamines obtained by interaction of aromatic monoamines with formaldehyde or other aldehydes, for example:

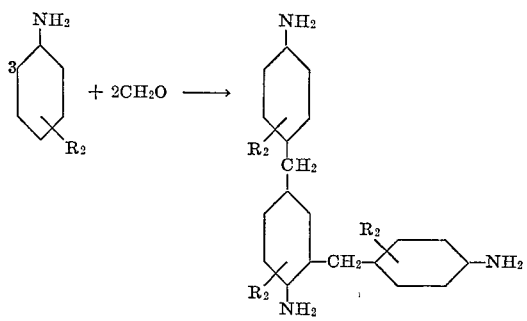

wherein $R_2$ is hydrogen or an alkyl group.

Polyoxyalkylene polyols having sulfur bridges include the condensation products of thioglycol with itself or with other polyhydric alcohols such as ethylene glycol, diethylene glycol, trimethylolpropane and the like. Such polyols can also be condensed with the abovementioned aromatic amines and phenols. Other suitable polycondensation products having sulfur and nitrogen bridges include those obtained by reaction of thioglycol with aromatic amines such as xylidene, toluidines or reaction products of these aromatic amines with alkylene oxides such as ethylene oxide, propylene oxide, butylene oxide, their mixtures and the like. It is to be understood that any of the above-mentioned polyols which are used in the resin component should have an average molecular weight of from 260 to 1300 and should contain from about two to about eight terminal hydroxyl groups. The above-mentioned polyols are also known as polyethers.

The resin component also contains a chemically hindered primary aromatic diamine. A particularly useful chemically hindered aromatic diamine is 4,4'-methylenebis(2-chloroaniline) which is also known by the trade name of MOCA. The diamine is the curing agent for the prepolymer. Such chemically hindered aromatic diamines are aromatic diamines which have one or more negative substituents on the aromatic ring to which the amine group is attached. Examples of such negative substituents include halogen groups, nitro groups and the like. Other examples of chemically hindered aromatic diamines include 4,4'-methylenebis(2-bromoaniline),
4,4'-methylenebis(2-iodoaniline),
4,4'-methylenebis(2-fluoroaniline),
4,4'-methylenebis(2-methoxyaniline);
4,4'-methylenebis(2-ethoxyaniline);
4,4'-methylenebis(2-methylaniline);
4,4'-methylenebis(2-ethylaniline);
4,4'-methylenebis(2-isopropylaniline);
4,4'-methylenebis(2-n-butylaniline);
4,4'-methylenebis(2-n-octylaniline);
4,4'-methylenebis(2-nitroaniline);
2,4-dimethyl-1,3-phenylenediamine;
4,6-dimethyl-1,3-phenylenediamine;
2,2'-dimethylbenzidine;
2,2'-dichloro-3,3'-dimethylbenzidine;
2,2'-dichlorobenzidine;
2,2'-dimethoxybenzidine;
2,2',5,5'-tetramethylbenzidine;
2,2'-dichloro-5,5'-diethoxybenzidine;
2,2'-difluorobenzidine;
2,2',6,6'-tetrachlorobenzidine;
4,4'-diamino-3,3'-dichlorodiphenyl,
1,4-diamino-2,3-dichloroindene,
1,4-diamino-2,3-dichlorophenanthrene and the like.

The resin component also contains about equal parts by weight of a solubilizer based on the weight of polyol employed. One particularly useful solubilizer is dipropylene glycol dibenzoate. Another useful solubilizer is octyl diphenyl phosphate.

As examples of additional solubilizers which may be employed in the present invention, there may be mentioned the following types of solubilizers. Adipic acid derivatives such as diethyl adipate, dibutyl adipate, di-isobutyl adipate, di-n-hexyl adipate, dicapryl adipate, di-(2-ethylhexyl) adipate, di-isooctyl adipate, dinonyl adipate, octyl decyl adipate, straight chain alcohol adipate, didecyl adipate, polypropylene adipate modified, polypropylene adipate, dimethoxyethyl adipate, diethoxyethyl adipate, dibutoxyethyl adipate, dibutoxyethoxy ethyl adipate, ditetrahdrofurfuryl adipate and the like may be used. Other useful solubilizers include azelaic acid derivatives such as dicyclohexyl azelate, di-2-ethylbutyl azelate, di-2-ethylhexyl azelate, di-n-hexyl azelate, di-isooctyl azelate, di-2-ethylhexyl-4-thioazelate and the like. Useful benzoic acid derivatives include 2-ethylhexyl-p-oxybenzoate, di-ethylene glycol dibenzoate, dipropylene glycol dibenzoate, ethylene glycol dibenzoate, triethylene glycol dibenzoate, polyethylene glycol (200) dibenzoate, polyethylene glycol (600) dibenzoate, benzophenone and the like. Biphenyl derivatives such as chlorinated biphenyl and the like may be used. Caprylic acid derivatives such as butanediol dicaprylate and the like may also be used. Useful citric acid derivatives include triethyl citrate, tri(2-ethyl hexyl) citrate, tricyclohexyl citrate, tri-n-butyl citrate, acetyl triethyl citrate, acetyl tri-n-butyl citrate, acetyl tri-n-octyl n-decyl citrate and the like. Useful ether derivatives include dibenzyl ether, (bis(p-(1,1,3,3-tetramethyl butyl)-phenyl)ether), polyvinylether and the like. Useful ethyl hexoic acid derivatives include 2,2'-(2-ethylhexamido diethyl di-(2-ethylhexoate)) and the like. Useful formals include dibutoxy-ethoxyethyl formal and the like. Useful fumaric acid derivatives include dibutyl fumarate, diisooctyl fumarate, dioctyl fumarate and the like. Useful glycerol derivatives include glycerol triacetate, glycerol tributyrate, glycerol ether acetate and the like. Glycol derivatives such as ethylene gycol dipropionate, ethylene glycol dibutyrate, diethylene glycol dipelargonate, triethylene glycol dipelargonate, diethylene glycol dipropionate, triethylene glycol diacetate, triethylene glycol dipropionate, triethylene glycol di-(2-ethylbutyrate), triethylene glycol di-caprylate-caprate, triethylene glycol di-(2-ethylhexoate), triethylene glycol dicaprylate, tetraethylene glycol dicaprylate, polyethylene glycol di-(2-ethylhexoate), methyl phthalyl ethyl glycolate, ethyl phthalyl ethyl glycolate, butyl phthalyl butyl glycolate, di-(2-ethylhexyl) diglycolate and the like. Hydrocarbons such as aromatic hydrocarbons and the like may be used. Isobutyric acid derivatives such as 2,2,4-trimethyl-1,3-pentanediol diisobutyrate and the like may be used. Isophthalic acid derivatives such as dimethyl isophthalate, di(2-ethylhexyl) isophthalate, diisooctyl isophthalate and the like may be used. Useful lauric acid derivatives include butyl laurate, 1,2-propylene glycol monolaurate, ethylene glycol monoethyl ether laurate, ethylene glycol monobutyl ether laurate, glycerol monolaurate, diethylene glycol monolaurate, polyethylene glycol (400) dilaurate and the like. Maleic acid derivatives such as di-n-butyl maleate, dioctyl maleate and the like may be used. Mellitates such as mixed n-octyl and n-decyl trimellitate, trioctyl trimellitate, mixed iso-octyl and iso-decyl trimellitate, triisooctyl trimellitate, diisooctyl monoisodecyl trimellitate, triisodecyl trimellitate and the like may be used. Myristic acid derivatives such as isopropyl myristate, n-butyl myristate and the like may be used. Useful oleic acid derivatives include methyl oleate, n-propyl oleate, isopropyl oleate, butyl oleate, amyl oleate, octyl fatty acid esters, ethylene glycol monomethyl ether oleate, 1,2-propylene glycol monooleate, ethylene glycol monobutyl ether oleate, tetrahydrofurfuryl oleate, glycerol monooleate, diethylene glycol monooleate and the like. Useful palmitic acid derivatives include isopropyl palmitate, n-butyl palmitate, isooctyl palmitate, tetrahydrofurfuryl palmitate and the like. Paraffin derivatives include chlorinated paraffin and the like. Pelargonic acid derivatives include diethylene glycol dipelargonate, triethylene glycol dipelargonate, 2-butoxyethyl pelargonate, butanediol dipelargonate and the like. Pentaerythritol derivatives include pentaerythritol fatty acid ester and the like. Useful phosphoric acid derivatives include triethyl phosphate, tributyl phosphate, tri-(2-ethylhexyl) phosphate, tributoxyethyl phosphate, triphenyl phosphate, cresyl diphenyl phosphate, tricresyl phosphate, tri-dimethylphenyl phosphate, alkyl phosphate ester, alkyl aryl phosphate, diphenyl mono-o-xenyl phosphate, diethyl ethylphosphonate, dibutyl butylphosphonate and the like. Useful phthalic acid derivatives include dimethyl phthalate, diethyl phthalate, dipropyl phthalate, dibutyl phthalate, di-isobutyl phthalate, diamyl phthalate, dihexyl phthalate, dimethyl isobutylcarbinyl phthalate, butyl octyl phthalate, butyl isodecyl phthalate, butyl iso-hexyl phthalate, dioctyl phthalate, di-n-octyl phthalate, dioctyl isophthalate, di-isooctyl phthalate, diisooctyl isophthalate, dicapryl phthalate, mixed alcohol phthalate, mixed normal alcohol phthalate, di-(2-ethylhexyl) phthalate, dinonyl phthalate, n-octyl-n-decyl phthalate, mixed n-decyl and n-octyl phthalate, octyl decyl phthalate, di-decyl phthalate, ditridecyl phthalate, decyltridecyl phthalate, ditridecyl phthalate, blend (50/50) of di-octyl and di-octyl-decyl phthalates, blend (50/50) of di-octyl and di-decyl phthalates, octyl fatty phthalic ester, ethylhexyl-decyl phthalate, butyl-ethylhexyl phthalate, mixed alkyl phthalate, mixed normal alkyl phthalate, fatty acid phthalate, diallyl phthalate, butyl cyclohexyl phthalate, butyl benzyl phthalate (BBP), dicyclohexyl phthalate, di(methylcyclohexyl) phthalate, diphenyl phthalate, alkyl aryl modified phthalate, alkyl aryl phthalates, 2-ethyl hexyl isodecyl phthalate, dimethoxyethyl phthalate, diethoxyethyl phthalate, di (ethoxyethoxyethyl) phthalate, dibutoxyethyl phthalate, di n-heptyl phthalate, bis-(diethylene glycol monoethyl ether) phthalate, methylcyclohexyl isobutyl phthalate, high molecular weight phthalate, straight chain alcohol phthalate and the like. Useful ricinoleic acid derivatives include metyl ricinoleate, methyl acetyl ricinoleate, methyl acetyl ricinoleate (modified), butyl ricinoleate, n-butyl acetyl ricinoleate, ethylene glycol ricinoleate, propylene glycol ricinoleate, methoxyethyl ricinoleate, methoxyethyl acetyl ricinoleate, methoxyethyl acetyl ricinoleate (modified), glycerol monoricinoleate, diethylene glycol monoricinoleate, glyceryl triacetyl ricinoleate and the like. Useful sebacic acid derivatives include dimethyl sebacate, diethyl sebacate, dibutyl sebacate, dioctyl sebacate, di-isooctyl sebacate, di-n-butyl isosebacate, dibutoxyethyl sebacate, dibenzyl sebacate, mixed sebacate adipate ester, mixed alcohol sebacate and the like. Useful stearic acid derivatives include n-butyl stearate, butoxyethyl stearate, octyl stearate, cyclohexyl stearate, 1,2-propylene glycol monostearate, ethylene glycol monomethyl ether stearate, ethylene glycol monobutyl ether stearate, glycerol monostearate, glyceryl tri-acetoxy stearate, butyl acetoxystearate, diethylene glycol distearate, tetraethylene glycol monostearate, tetraethylene glycol distearate, methyl pentachlorostearate (stabilized), methoxy-ethyl acetoxystearate and the like. Succinic acid derivatives such as diethyl succinate, dibutyl succinate and the like may be used. Sucrose derivatives such as sucrose octaacetate, sucrose acetate isobutyrate, sucrose benzoate and the like may be used. Tall oil derivatives such as methyl ester of tall oil and the like may be used. Useful tartaric acid derivatives such as diethyl tartrate, dibutyl tartrate and the like may be used. Other useful solubilizers include epoxy-type compounds, hydrogenated triphenyl polyesters, styrene resins, $\alpha$-methylstyrene resins and the like. Many of these solubilizers do not have definite chemical structures but are used extensively as nonreactive additives in plastics and/or resins.

PREPARATION OF THE QUASI PREPOLYMER COMPONENT

The quasi prepolymer component can be prepared by reacting a diisocyanate having an NCO equivalent of about 1.0 and a polyol having an average molecular weight of from about 710 to about 1290 having at least two terminal hydroxyl groups and having an OH equivalent of from about 0.2 to about 0.7 under anhydrous conditions in a flask. The flask is equipped with an agitator, thermometer, provisions for maintaining an anhydrous nitrogen blanket over the diisocyanate and provisions for external cooling and heating the contents of the flask. The diisocyanate and polyol are heated under anhydrous conditions under a nitrogen blanket to a temperature of from about 20° C. to about 80° C. From about 0.2 OH equivalent to about 0.7 OH equivalent of a dried polyoxy alkylene polyol having an average molecular weight of from about 710 to about 1290 and at least two terminal hydroxyl groups is charged to the diisocyanate in the flask over a period of time from about 15 minutes to about 120 minutes. The resulting reaction mixture is then reacted under anhydrous conditions at a temperature of from about 20° C. to about 80° C. for a period of time from about 3 hours to about 72 hours to obtain the desired prepolymer which is the prepolymer component. The prepolymer has an isocyanate content of from about 4% by weight to about 10% by weight. The isocyanate content represents the percent by weight of reactive isocyanate groups present in the prepolymer, i.e., unreacted isocyanate groups. The prepolymer is then cooled to about 15° C. to about 40° C. and degassed under vacuum of from about 2 mm. Hg to about 700 mm. Hg for about 2 hours to about 24 hours to remove volatiles such as water, dissolved gases and the like. After all of the volatiles are removed by degassing, the prepolymer is substantially bubble free and is cooled to room temperature. A bubble free prepolymer component is substantially free of volatiles such as entrapped gas and the like. The cooled, bubble free prepolymer, which is the desired form of the prepolymer component is then stored in a sealed, gas free container for subsequent use with the resin component described above. When desired, the prepolymer component described above can be prepared by an alternate procedure. This alternate procedure involves reaction of only part of the required amount of diisocyanate with all of the polyol. The resulting reaction product is then reacted with the remaining part of the required amount of diisocyanate to prepare the desired prepolymer. The principal difference between the foregoing procedure and the alternate procedure is in the manner in which the diisocyanate is added and reacted. Otherwise, reaction conditions such as quantities used, reaction temperatures, reaction times and the like are comparable. Examples of organic diisocyanates which can be used in preparing the prepolymer are given below. Such diisocyanates include tolylene-2,4-diisocyanates, tolylene 2,6-diisocyamate, tolylene diisocyanate (65% 2,4; 35% 2,6), tolylene diisocyanate (80% 2,4; 20% 2,6), 1,6-hexamethylenediisocyante (HDI), 1,4-tetramethylenediisocyanate, hexamethylene diisocyanate, 1,10-decamethylenediisocyanate, 1,5-naphthalenediisocyanate (NDI), cumene-2,4-diisocyanate, 4-methoxy-1,3-phenylenediisocyanate, 4-chloro - 1,3 - phenylenediisocyanate, 4 - bromo - 1,3- phenylenediisocyanate, 4 - ethoxy - 1,3 - phenylenediisocyanate, 2,4' - diisocyanatodiphenylether, diphenyl methane - 4,4' - diisocyanate (MDI), 5,6 - dimethyl-1,3 - phenylenediisocyanate, 2,4 - dimethyl - 1,3-phenylene diisocyanate, 4 - isopropyl - 1,3 - phenylene diisocyanate, 4,4' - diisocyanatodiphenylether, benzidinediisocyanate, o - nitrobenzidene diisocyanate, 4,6 - dimethyl - 1,3 - phenylenediisocyanate, 9,10-anthracene - diisocyanate, 4,4' - diisocyanatodibenzyl, 3, 3' - dimethyl - 4,4' - diisocyanatodiphenylmethane, 2,6-dimethyl - 4,4' - diisocyanatodiphenyl, 2,4 - diisocyanatotilbene, 4,4'-diphenyl diisocyanate (XDI), 3,3'-dimethyl-4,4' - diphenyl diisocyanate (TODI), 3,3' - dimethoxy-4,4' - diphenyl diisocyanate (DADI), 1,4 - anthracenediisocyanate, mesitylene diisocyanate, durylene diisocyanate, 2,5 - fluoroenediisocyanate, 1,8 - naphthalene - diisocyanate, 2,6 - diisocyanatobenzofuran and the like. Another useful isocyanate is DDI, a diisocyanate derived from dimer acids containing 36 carbon atoms and manufactured by General Mills. Mixtures of organic diisocyanates can also be used.

As examples of polyoxyalkylene polyols which can be employed in the preparation of the quasi prepolymer, the following polyoxyalkylene polyols can be employed. A polyoxyalkylene polyol having an average molecular weight of from about 710 to about 1290 and having from about two to about six terminal hydroxyl groups or mixtures of two or more such polyols can be used. Specific polyols include polyoxypropylene glycols having an average molecular weight of 1000 and having two terminal hydroxyl groups, polyoxypropylene glycols having an average molecular weight of about 1200 and containing two terminal hydroxyl groups, polyoxyalkylene triols having an average molecular weight of about 1270 and having three terminal hydroxyl groups. Polyoxyalkylene polyols having four or more terminal hydroxyl groups can also be employed. Likewise, glycols such as a polyoxybutylene glycol having an average molecular weight of 750, polyoxyhexamethylene glycol having an average molecular weight of 950, polyoxyoctamethylene glycol having an average molecular weight of 1150, polyoxynonamethylene glycol having an average molecular weight of 1160, polyoxydecamethylene glycol having an average molecular weight of 1170, polyoxydodecamethylene glycol having an average molecular weight of 1190 and mixtures thereof can be used. Polyoxyalkalene glycols containing several different radicals in the molecular chain such as, for example, compounds of the formula:

$$HO(CH_2OC_3H_6O)_nH$$

wherein $n$ is an integer of from about 9 to about 17 can also be used. For example, polyacetals having two terminal groups and average molecular weights of from about 710 to about 1290 can be used. Such polyacetals are prepared by reaction of an aldehyde and an alcohol such as formaldehyde and a propylene glycol. Other polyoxyalkylene polyols, which can be employed in the preparation of the quasi prepolymer component, include those prepared by the reaction of 1,2-alkylene oxides such as propylene oxide, butylene oxide, styrene oxide, dicyclopentadiene oxide, their mixtures and the like with polyhydroxy compounds such as glycerol, hydroxyl containing glycerides, trimethylolethane, trimethylolpropane, 1,2,6-hexanetriol, pentaerythritol, dipentaerythritol, sorbitol, mannitol and the like, glucosides such as methyl, ethyl, propyl, butyl and 2-ethylhexyl arabinoside, xyloside, fructoside, glucoside, rhammoside and sucrose. For example, a propylene oxide adduct of glycerol having an average molecular weight of 1010 can be used. A propylene oxide adduct of trimethylol propane terminated with ethylene oxide to obtain a product having three primary hydroxyl groups and having an average molecular weight of 990 can also be used. Likewise, a propylene oxide adduct of pantaerythritol having an average molecular weight of 1000 and four terminal hydroxyl groups can be used. A propylene oxide adduct of 1,2,6-hexanetriol having an average molecular weight of 1000 can be employed. Polyoxyalkylene polyols obtained by reacting the above-mentioned alkylene oxides with mononuclear polyhydroxybenzenes such as resorcinol, pyrogallol, phloroglucinol, hydroquinone, 4,6-di - ti - butylcatechol, catechol, orcinal and other alkylated polyhydroxybenzenes are also useful. Likewise, polyoxyalkylene polyols prepared by reacting the above-mentioned alkylene oxides with fused ring systems such as 3-hydroxy-2-naphthol, 6-7 - dihydroxy - 1 - naphthol, 2,5 - dihydroxy - 1 - naphthol, 9,10-dihydroxy anthracene, 2,3-dihydroxy phenanthrene and the like can be used.

Other useful polyoxyalkylene polyols having the above-mentioned molecular weights can be prepared by reacting the above mentioned alkylene oxides or mixtures thereof with polynuclear phenols such as the various di-, tri- and tetraphenol derivatives in which the phenols are attached to each other by means of single bonds or by an aliphatic hydrocarbon radical such as methylene radical.

Another useful group of polyoxyalkylene polyols which can be employed are the alkylene adducts of the Novolaks having the abovementioned molecular weights. The Novolaks are believed to be mixtures of polynuclear compounds having a diphenylmethane type of structure such as 4,4'-dihydroxy diphenylmethane and 2,4'-dihydroxy diphenylmethane formed by the Baeyer reaction of phenol and formaldehyde. In a typical synthesis, Novolaks are prepared by condensing one mole of a phenol such as phenol, cresol or other alkylated phenol with 0.8 mole of an aldehyde such as formaldehyde or furfuraldehyde under acidic conditions at temperatures of from about 160° C. to about 170° C. Such polynuclear phenols may contain up to 6 units. It is to be understood that Novolaks employed in the preparation of polyols for the present invention will not contain a sufficient number of units that when they are reacted with alkylene oxides to obtain the desired polyols, the molecular weights of the resulting polyols will not exceed the above-mentioned average molecular weights. The Novolaks are non-curable thermoplastic resins. It is to be understood that any of the abovementioned polyols which are used in the quasi prepolymer component should have an average molecular weight of from 710 to 1290 and should contain from about two to about six terminal hydroxyl groups. The abovementioned polyols are also known as polyethers.

PREPARATION AND USE OF THE COMPOSITIONS

The polyurethane compositions of the present invention are prepared in the following manner. The resin component described above which has a combined $NH_2$ equivalent and OH equivalent of about 0.9 and the quasi prepolymer component described above which has from about 0.8 NCO equivalent to about 1.2 NCO equivalent are mixed at room temperature until a uniform composition is obtained. The resulting uniform composition is then degassed under vacuum at about 2 mm. Hg to about 700 mm. Hg until the composition is bubble-free. After the composition is bubble-free, the vacuum is released and the bubble-free composition is used as an encapsulating, casting and/or molding composition.

The above compositions can be used to form shapes and the resulting shapes cured. For example, the above compositions can be used as an encapsulating, casting, molding and/or like composition in either batch or continuous processing. A typical batch process involves pouring the bubble-free composition into a suitable mold or container which has been previously coated with a mold release compound such as Dow Corning DC–400 (a silicone fluid) or the like. When desired, molds having their surfaces permanently coated with polytetrafluoroethylene or the like may be used. The mold or container containing the composition is then placed in an oven at a temperature of from about 120° F. to about 250° F. for from about 2 hours to about 12 hours. Likewise, the composition can be employed to prepare shapes such as films, sheets, coatings, laminates and the like. The composition cures within several hours at the above temperatures. For example, the composition will cure in from about two to about three hours at about 212° F. The compositions of the present invention have various advantages over previously used compositions in that longer curing times, that is, five hours or more, are not required and the compositions do not pass through a semi-solid stage before they become hard cured elastomers. The compositions of the present invention require less than about 3 hours to cure at the abovementioned temperature range and do not pass through a semi-solid stage. Since the polyurethane compositions of the present invention have useful room temperature shelf lives in excess of one year, time is not of the essence during preparation of the compositions or in any operation involving preparation or use of the compositions at room temperature prior to curing them at elevated temperatures. It is to be understood that when the partially cured molded article has attained sufficient rigidity, the molded article can be removed from the mold and placed in an oven to complete the cure. The compositions can also be cast in preheated molds. When desired, rotational casting equipment, centrifugal casting equipment, transfer molding equipment, compression molding equipment and the like can be employed.

Auxiliary agents such as accelerators, retarders, fillers, dyestuffs, pigments, surface depressants and the like can be incorporated into the compositions provided such agents produce the desired result and do not adversely affect the desirable properties of the compositions. Suitable accelerators include lead, mercury, antimony, tin salts. For example, lead octoate, stannous octoate, dibutyl tin dilaurate and the like can be used. Useful fillers include calcium carbonate, silicon dioxide, titanium dioxide, barytes, calcium sulfate, carbon black and the like. Suitable retarders include benzoyl chloride, acetyl chloride, propionyl chloride, oxalyl chloride, adipic acid chloride, hydrogen chloride and the like. Useful dyestuffs include Oil Yellow, Heliogen Blue BNC New CF, Resoform Blue BP, Resoform Brilliant Green GP and the like. Suitable pigments include carbon black, phthalocyanine blue, phthalocyanine green, benzidine yellow, Watchung Red RT–428–D and the like. Useful surface depressants include dimethyl polysiloxane, anhydrous surfactants and the like.

Physical properties of cured elastomers obtained with the above compositions and procedures can be evaluated by test methods such as the Shore A hardness test (ASTM D676–59T), tensile strength at break point p.s.i. (ASTM D412–61T), elongation at break percent (ASTM D412–61T), tangent modulus at 100% elongation p.s.i. (ASTM D412–62T), tangent modulus at 300% elongation p.s.i. (ASTM D412–62T), tear (split) p.l.i. (ASTM D–470–59T), tear (Graves) p.l.i. and the like.

Typical application for the above cured elastomers include their use in shapes such as friction and drive wheels; solid industrial truck tires, caster wheels; rollers for printing, embossing, conveying, feeding; shock absorbent pads, bumpers; flexible mechanical couplings, gears; laminates or coatings on metals or fabrics, for belting, chutes or bin linings; abrasive wheel binder; gaskets and seals; accumulator bladder; mallet and hammer heads; electrical potting, encapsulation, pump impellers; and the like.

For a fuller understanding of the nature and objects of the present invention, reference may be made to the following examples, which are given merely to illustrate the invention and are not to be construed in a limiting sense. All weights, proportions and percents are by weight unless otherwise indicated. Likewise, all references to temperature are ° F. unless otherwise indicated.

EXAMPLE I

Preparation of a resin component.
35.68 parts by weight of Pluracol X–245 (Wyandotte Chemical Corp.), i.e., a polyoxypropylene diol which was obtained by the condensation of a bisphenol (aromatic diol) with propylene oxide and had a hydroxyl number of 219, an equivalent weight of 256 and a molecular weight of 512. 33.20 parts by weight of a chemically hindered aromatic diamine which was 4,4′-methylene-bis(2-chloroaniline) also known by the trade name MOCA, having an equivalent weight of 133 and a molecular weight of 266 and 31.12 parts by weight of a solubilizer which was dipropylene glycol dibenzoate were mixed together at room temperature. The resulting mixture was then heated to a temperature of about 220° F. for about 120 minutes to dissolve the diamine. The resulting solution was then heated at about 140° F. under a vacuum of about 5 mm. Hg to remove water from the solution. When the water content of the solution was less than about 0.01% by weight, the dried resin component was cooled under anhydrous conditions to room temperature and stored in a sealed container at about 77° F. to prevent moisture contamination. The resin component contained 0.25 $NH_2$ equivalent and 0.14 OH equivalent.

EXAMPLE II

Preparation of a resin component.
22.33 parts by weight of Pluracol TP–440 (Wyandotte Chemical Corp.), i.e., a triol, which is a polyoxypropylene adduct of trimethylolpropane having an average molecular weight of about 418 and a hydroxyl number of 404, 38.83 parts by weight of a chemically hindered aromatic diamine which was 4,4′-methylene-bis(2-chloroaniline) also known by the trade name MOCA, having an equivalent weight of 133 and a molecular weight of 266 and 38.84 parts by weight of a solubilizer which was dipropylene glycol dibenzoate were mixed at room temperature. The resulting mixture was then heated at about 220° F. for about 120 minutes to dissolve the diamine. The resulting solution was then heated at about 140° F. under a vacuum of about 5 mm. Hg to remove water from the solution. When the water content of the solution was below about 0.01% by weight, the resulting dried resin component was cooled under anhydrous conditions to room temperature and stored in a sealed container at about 77° F. to prevent moisture condensation. The resin component contained 0.29 $NH_2$ equivalent and 0.16 OH equivalent.

EXAMPLE III

Preparation of a quasi prepolymer component.
77.4 parts by weight of a polypropylene glycol having an average molecular weight of about 1200 and representing 0.124 OH equivalent was charged into a flask and dried at about 105° C. under a vacuum of about 2 mm. Hg. When the water content of the glycol was less than 0.01% by weight, the glycol was cooled under anhydrous conditions to room temperature. 22.6 parts by weight of tolylene diisocyanate containing 80% by weight of 2,4-isomer and 20% by weight of 2,6-isomer, that is, 0.25 NCO equivalent was charged under anhydrous conditions at room temperature into a reaction flask and the 74.4 parts by weight of anhydrous polypropylene glycol obtained above was added at room temperature. The diisocyanate and polypropylene glycol mixture was slowly heated to about 80° C. under an anhydrous nitrogen blanket. The mixture was then reacted at about 75° C. to about 85° C. for about three hours. The resulting reaction product was an isocyanate terminated prepolymer which had a reactive isocyanate content of about 5.5% by weight. The prepolymer was then cooled under nitrogen to about 45° C. and degassed under a vacuum of about 2 mm. Hg at this temperature until all of the volatiles were removed. The resulting degassed prepolymer was completely bubble-free and was stored under anhydrous conditions at a temperature of about 77° F. in a gas-free container.

EXAMPLE IV

Preparation of a quasi prepolymer component.

69.0 parts by weight of a polypropylene glycol having an average molecular weight of about 775 and representing 0.018 OH equivalent was charged into a flask and dried at about 105° C. under a vacuum of about 2 mm. Hg. When the water content of the glycol was less than 0.01% by weight, the glycol was cooled under anhydrous conditions to room temperature. 31.0 parts by weight of tolylene diisocyanate containing 80% by weight of 2,4-isomer and 20% by weight of 2,6-isomer, that is, 0.35 NCO equivalent was charged under anhydrous conditions at room temperature into a dry reaction flask and the 69.0 parts by weight of anhydrous polypropylene glycol obtained above was added to the tolylene diisocyanate charge in the reaction flask. The resulting diisocyanate and polypropylene glycol mixture was slowly heated to about 80° C. under an anhydrous nitrogen blanket. The reaction mixture was reacted at about 75° C. to about 85° C. for about three hours. The resulting reaction product was an isocyanate terminated prepolymer which had a reactive isocyanate content of about 7.2% by weight. The prepolymer was then cooled under nitrogen to about 45° C. and degassed at this temperature under a vacuum of about 2 mm. Hg until all of the volatiles were removed. The resulting degassed prepolymer was completely bubble-free and was stored under anhydrous conditions at a temperature of about 77° F. in a gas-free container.

EXAMPLES V(A)-V(D)

Preparation and evaluation of cured elastomers obtained from four castable elastomer compositions which are mixtures of the above prepolymer components and resin components.

The prepolymer components obtained in Examples III and IV above and the resin components obtained in Examples I and II above were first used to prepare four castable polyurethane elastomer compositions which were subsequently cured. The compositions of the castable polyurethane elastomers as well as the properties of the resulting cured elastomers are set forth in Table I as Examples V(A) through V(D). First, the castable elastomer compositions were prepared in the following manner. The amount of prepolymer component required to give the specified NCO equivalent for the prepolymer component, as shown in Table I, and the amount of resin component required to give the specified combined $NH_2$ equivalent and OH equivalent for the resin component, as shown in Table I, were mixed together at room temperature until a uniform composition was obtained. The resulting uniform composition, which was a castable polyurethane elastomer composition, was then degassed under a vacuum at about 2 mm. Hg until the composition was bubble-free. The bubble-free castable polyurethane elastomer compositions were then poured into molds which had been previously coated with a mold release compound, i.e., Dow Corning DC–400. The compositions in the molds were then cured for about three hours at a temperature of about 212° F. to obtain cured polyurethane elastomers. The physical properties of the cured polyurethane elastomers were determined. Such physical properties included hardness Shore A, tensile strength at break point p.s.i., elongation at break percent, tangent modulus at 100% elongation p.s.i., tangent modulus at 300% elongation p.s.i. and tear (Graves) p.l.i. Table I shows the physical properties obtained with the cured polyurethane elastomers. The values for hardness Shore A, tensile strength and elongation are arithmetic means of four and 95% confidence limits were calculated. These data show that the cured polyurethane elastomers have excellent physical properties.

TABLE I

| | Castable Elastomer Composition | | | | | Physical Properties of Cured Elastomer | | | | | |
|---|---|---|---|---|---|---|---|---|---|---|---|
| Ex. | Prepolymer component of example | NCO equivalent of prepolymer component | Resin component of example | Combined $NH_2$ and OH equivalent of resin component | Ratio of NCO equivalent of prepolymer component to $NH_2$ and OH equivalent of resin component | Hardness Shore A | Tensile strength at break point, p.s.i. | Elongation at break, percent | Tangent modulus at 100% elongation, p.s.i. | Tangent modulus at 300% elongation, p.s.i. | Tear Graves, p.l.i.[1] |
| V(A) | III | 0.43 | I | 0.39 | 1.10 | 70 | 960 | 430 | 422 | 699 | |
| V(B) | III | 0.50 | II | 0.45 | 1.11 | 74 | 953 | 320 | 417 | | 219 |
| V(C) | IV | 0.42 | I | 0.39 | 1.08 | 85 | 1,954 | 390 | 813 | 1,508 | 221 |
| V(D) | IV | 0.44 | II | 0.45 | 0.98 | 87 | 2,174 | 380 | 690 | 1,434 | 224 |

[1] P.l.i. (pounds per linear inch).

What is claimed is:

1. A cured castable polyurethane elastomer composition prepared by reacting
    (A) a substantially anhydrous resin component comprising
        (1) about 0.3 equivalent (based on OH) of at least one polyoxyalkylene polyol having an average molecular weight of from about 260 to about 1300,
        (2) about 0.6 equivalent (based on $NH_2$) of at least one chemically hindered primary diamine, and
        (3) about equal parts by weight of dipropylene glycol dibenzoate based on the weight of said polyol,
    said polyol and said diamine being present in amounts sufficient to provide about 0.9 equivalent (based on OH) of said polyol and (based on $NH_2$) of said diamine, and
    (B) a quasi prepolymer component comprising at least one reaction product of
        (1) about 1.0 NCO equivalent of at least one organic diisocyanate, and
        (2) from about 0.2 to about 0.7 equivalent (based on OH) of at least one polyoxyalkylene polyol having an average molecular weight of from about 710 to about 1290,
    said quasi prepolymer being present in an amount sufficient to provide from about 0.8 NCO equivalent to about 1.2 NCO equivalents in said composition.

2. The composition of claim 1 wherein said chemically hindered diamine is 4,4'-methylene-bis(2-chloroaniline).

3. A cured polyurethane elastomer comprising the reaction product of the composition of claim 1 cured at from about 120° F. to about 250° F.

4. A process for preparing a cured polyurethane elastomer which comprises
    (I) preparing a castable polyurethane composition, which is substantially anhydrous and substantially bubble free, comprising
        (A) a substantially anhydrous resin component comprising
            (1) about 0.3 equivalent (based on OH) of at least one polyoxyalkylene polyol having an average molecular weight of from about 260 to about 1300,
(2) about 0.6 equivalent (based on NH$_2$) of at least one chemically hindered primary diamine, and
(3) about equal parts by weight of dipropylene glycol dibenzoate based on the weight of said polyol, said polyol and said diamine being present in amounts sufficient to provide about 0.9 equivalent (based on OH) of said polyol and (based on NH$_2$) of said diamine, and (B) a quasi prepolymer component comprising at least one reaction product of
(1) about 1.0 NCO equivalent of at least one organic diisocyanate, and
(2) from about 0.2 to about 0.7 equivalent (based on OH) of at least one polyoxyalkylene polyol having an average molecular weight from about 710 to about 1290, said quasi prepolymer being present in an amount sufficient to provide from about 0.8 NCO equivalent to about 1.2 NCO equivalents in said composition, (II) forming a shape from said composition, and thereafter
(III) heating said shape at a temperature of from about 120° F. to about 250° F. to obtain said cured castable elastomer, with the proviso that said composition is maintained in a substantially anhydrous and a substantially bubble free condition during steps (II) and (III).

5. The process of claim 4 wherein said chemically hindered diamine is 4,4'-methylene-bis(2-chloroaniline).

References Cited
UNITED STATES PATENTS

| | | | |
|---|---|---|---|
| 3,036,996 | 5/1962 | Kogon | 260—77.5 |
| 3,188,302 | 6/1965 | Lorenz | 260—77.5 |
| 3,194,793 | 7/1965 | Kogon | 260—77.5 |

DONALD E. CZAJA, Primary Examiner

M. J. WELSH, Assistant Examiner

U.S. Cl. X.R.

117—161; 260—37, 47, 57, 72.5

UNITED STATES PATENT OFFICE
CERTIFICATE OF CORRECTION

Patent No. 3,489,723          Dated January 13, 1970

Inventor(s) Elise Rhoda Kraft

It is certified that error appears in the above-identified patent and that said Letters Patent are hereby corrected as shown below:

Column 1, lines 4, 5 and 6, change "Nopco Chemical Company, Newark, N.J., a corporation of New Jersey" to --Diamond Shamrock Corporation, Cleveland, Ohio, a corporation of Delaware--.

SIGNED AND
SEALED
JUN 2 1970

(SEAL)
Attest:

Edward M. Fletcher, Jr.
Attesting Officer

WILLIAM E. SCHUYLER, JR.
Commissioner of Patents